UNITED STATES PATENT OFFICE.

NILS COLLING JÜRGENS, OF CLIFTON, TEXAS.

EGG-PRESERVING COMPOUND.

SPECIFICATION forming part of Letters Patent No. 360,350, dated March 29, 1887.

Application filed August 14, 1886. Serial No. 210,923. (No specimens.)

*To all whom it may concern:*

Be it known that I, NILS COLLING JÜRGENS, of Clifton, in the county of Bosque and State of Texas, have invented a new and Improved Egg-Preserving Compound, of which the following is a full, clear, and exact description.

This invention consists in a new and useful composition of matter to be used for the preservation of eggs, the same being composed of the following ingredients, combined in or about the proportions stated, viz: silicate of sodium, one pint; gum-arabic, one-half to one ounce; sugar, one-half ounce; water, one pint. These ingredients are to be mixed as follows: I first dissolve the sugar and gum-arabic in the water, which should be boiling hot, and when or after the whole have become cold mix the silicate of sodium with it. The entire mixture or "dip," as I term it, should be shaken before using.

This dip or compound I use in different ways. Thus it may be used by pouring it upon the eggs to be preserved, in which case the lesser proportion above named of the gum-arabic will suffice. When such method of applying it is adopted for preserving in small quantities, I pour the compound on the eggs placed within a vessel sufficiently deep to allow the eggs to swim, so that they will be wet with the mixture over their whole surface. The eggs should be then removed from the vessel, and, while wet with the compound, be separately wrapped in paper, as lemons and other fruits are covered, after which they may be packed away in the usual manner.

Another method of applying the compound, which will be found more suitable for use upon a large scale, is to pour the compound upon the eggs, and, while the latter are wet with the mixture, to pack them away in sawdust or other like dust or material. The eggs being thus packed wet, the compound will, in conjunction with the dust, form a close cover to the eggs, excluding the air from them and protecting them against breakage during transportation, care being taken to pack the eggs so as not to touch one another.

Still another method of applying the compound is to take a sheet of thin but strong paper and to mark it off so that it can be readily used as independent wrappers for the eggs, and to apply the compound to the one side of it, after which it should be allowed to dry, which it will do quickly. When using such paper prepared with the compound it should be wet by brush or otherwise with water, to make it soft and pliable, so that it may be used to wrap the eggs in, as in the first-described method. Before using the eggs they should be put for a few minutes in water, to soften their paper wrappers, which may then be easily removed with a cloth.

Eggs having my improved compound applied to them may not only be preserved for a great length of time unimpaired by climatic changes, but when using them they will be free from all objectional flavor due to the preservative compound, as is the case with eggs packed in lime and other materials.

As the compound effectually excludes the air, it of course should not be applied to eggs designed for hatching purposes. It is not absolutely necessary to use any wrap; but the compound may be applied directly and exclusively as a cover to the eggs.

I am aware that silicate of soda has been used for excluding air from eggs; also, that eggs have been coated with a solution composed of gum-arabic, sugar, and glue.

Having thus fully described my invention, I claim as new and desire to secure by Letters Patent—

The herein-described composition of matter to be used for preserving eggs, consisting of silicate of sodium, gum-arabic, sugar, and water, in or about the proportions specified.

NILS COLLING JÜRGENS.

Witnesses:
JAMES I. MOORE,
S. M. THODBERG.